US012784957B2

(12) United States Patent
Ikebe

(10) Patent No.: US 12,784,957 B2
(45) Date of Patent: Nov. 3, 2026

(54) TRANSFORMER

(71) Applicant: DIAMOND&ZEBRA ELECTRIC MFG. CO., LTD., Osaka (JP)

(72) Inventor: Takashi Ikebe, Osaka (JP)

(73) Assignee: DIAMOND & ZEBRA ELECTRIC MFG. CO., LTD., Osaka (JP)

( * ) Notice: Subject to any disclaimer, the term of this patent is extended or adjusted under 35 U.S.C. 154(b) by 845 days.

(21) Appl. No.: 18/123,404

(22) Filed: Mar. 20, 2023

(65) Prior Publication Data

US 2023/0326652 A1 Oct. 12, 2023

(30) Foreign Application Priority Data

Apr. 12, 2022 (JP) ................................ 2022-065563

(51) Int. Cl.
*H01F 27/08* (2006.01)

(52) U.S. Cl.
CPC .................................... *H01F 27/08* (2013.01)

(58) Field of Classification Search
CPC ....................................................... H01F 27/08
See application file for complete search history.

(56) References Cited

U.S. PATENT DOCUMENTS

2010/0328893 A1* 12/2010 Higashidani ....... H05K 7/20927 361/702
2015/0155088 A1* 6/2015 Lee ......................... H01F 27/22 336/61
2015/0170819 A1* 6/2015 Yamashima ............ H01F 27/22 336/61
2016/0181014 A1* 6/2016 Watanabe ............. H01F 27/255 336/83
2018/0019047 A1* 1/2018 Matsuo ................. H01F 27/306

FOREIGN PATENT DOCUMENTS

CN 104205262 A 12/2014
JP 2011014669 A * 1/2011
JP 2015-103537 A 6/2015
JP 2016-119386 A 6/2016
JP 2016139699 A * 8/2016
JP 2019047105 A * 3/2019 ........... H01F 27/306

* cited by examiner

*Primary Examiner* — Malcolm Barnes
(74) *Attorney, Agent, or Firm* — Birch, Stewart, Kolasch & Birch, LLP

(57) ABSTRACT

A transformer includes: a coil; a core enclosing the coil, the core including a first surface, a second surface adjoining the first surface, and a third surface opposite to the first surface and adjoining the second surface; and a plurality of radiator plates each of which covers a part of the core. The first and third surfaces are covered by different radiator plates of the plurality of radiator plates. Preferably, the core further includes a fourth surface opposite to the second surface and adjoining the third surface, and the second and fourth surfaces are covered by different radiator plates of the plurality of radiator plates.

10 Claims, 7 Drawing Sheets

TRANSFORMER

CROSS-REFERENCE TO RELATED APPLICATION

This application claims priority on and the benefit of Patent Application No. 2022-065563 filed in JAPAN on Apr. 12, 2022. The entire disclosures of this Japanese Patent Application are hereby incorporated by reference.

BACKGROUND OF THE INVENTION

Field of the Invention

The present disclosure relates to transformers.

Description of the Related Art

Transformers are widely used for purposes such as conversion of AC voltages and transfer of electric power. Transformers have a structure in which a coil of wire is surrounded by a core made of a magnetic material such as ferrite. Transformers for high electric power generate a large amount of heat, and thus some of such transformers include a radiator plate located around the core. Japanese Laid-Open Patent Application Publication No. 2015-103537 discloses an investigation of a transformer cooling structure employing a radiator plate.

To achieve a cooling effect by a radiator plate, it is effective to cover a large portion of the surface of the core with the radiator plate and place the core and the radiator plate in contact with each other. However, there could be a gap between the core and the radiator plate due to reasons such as the manufacturing tolerances of the core and the radiator plate and the difference in thermal expansion coefficient between the core and the radiator plate. The gap between the core and the radiator plate could cause a decline in heat radiation performance.

The present inventors aim to provide a transformer in which little or no gap occurs between a radiator plate and a core.

SUMMARY OF THE INVENTION

A preferred transformer includes: a coil; a core enclosing the coil, the core including a first surface, a second surface adjoining the first surface, and a third surface opposite to the first surface and adjoining the second surface; and a plurality of radiator plates each of which covers a part of the core. The first and third surfaces are covered by different radiator plates of the plurality of radiator plates.

The inventors have found that if one radiator plate covers three successively adjoining surfaces of a core (a first surface, a second surface adjoining the first surface, and a third surface opposite to the first surface and adjoining the second surface), a gap is likely to occur between the core and the radiator plate. That is, in such a transformer, the difference between the "distance between the first and third surfaces" and the "distance between a portion of the radiator plate that covers the first surface and a portion of the radiator plate that covers the third surface" is increased due to reasons such as the manufacturing tolerances of the core and the radiator plate and the difference in thermal expansion coefficient between the core and the radiator plate, and this causes a gap between the first or third surface and the radiator plate.

In the transformer of the present disclosure, the first and third surfaces of the core are covered by different radiator plates. Thus, even if the "distance between the first and third surfaces" deviates from a given value due to reasons such as manufacturing tolerances and thermal expansion, the first and third surfaces can be in close contact with the corresponding radiator plates. In the transformer, little or no gap occurs between the radiator plates and the core. The transformer exhibits high heat radiation effect.

DESCRIPTION OF THE PREFERRED EMBODIMENTS

The following will describe in detail preferred embodiments with appropriate reference to the drawings.

Figure 1:
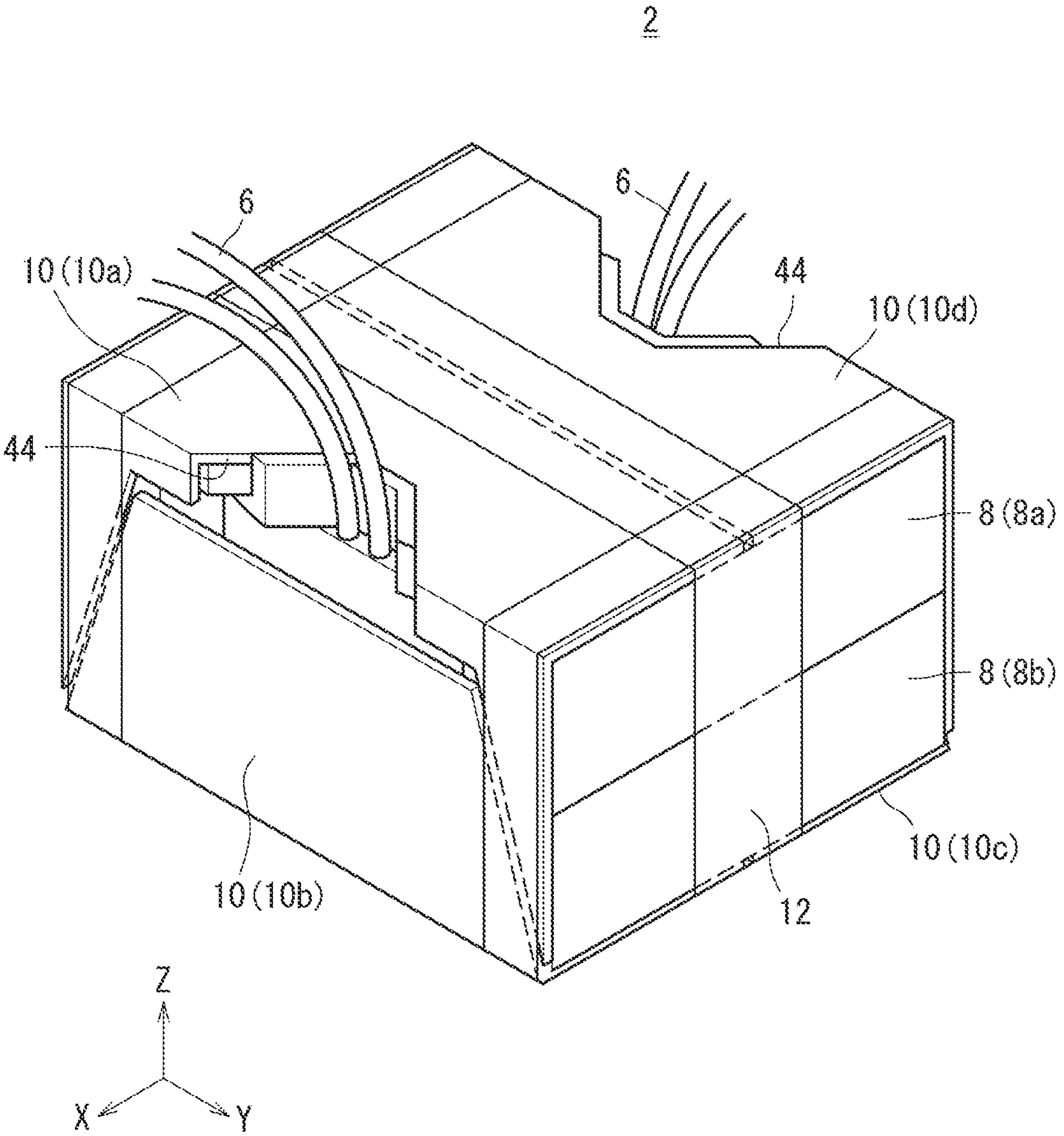
FIG. 1 is a perspective view showing a transformer according to one embodiment.
Figure 2:
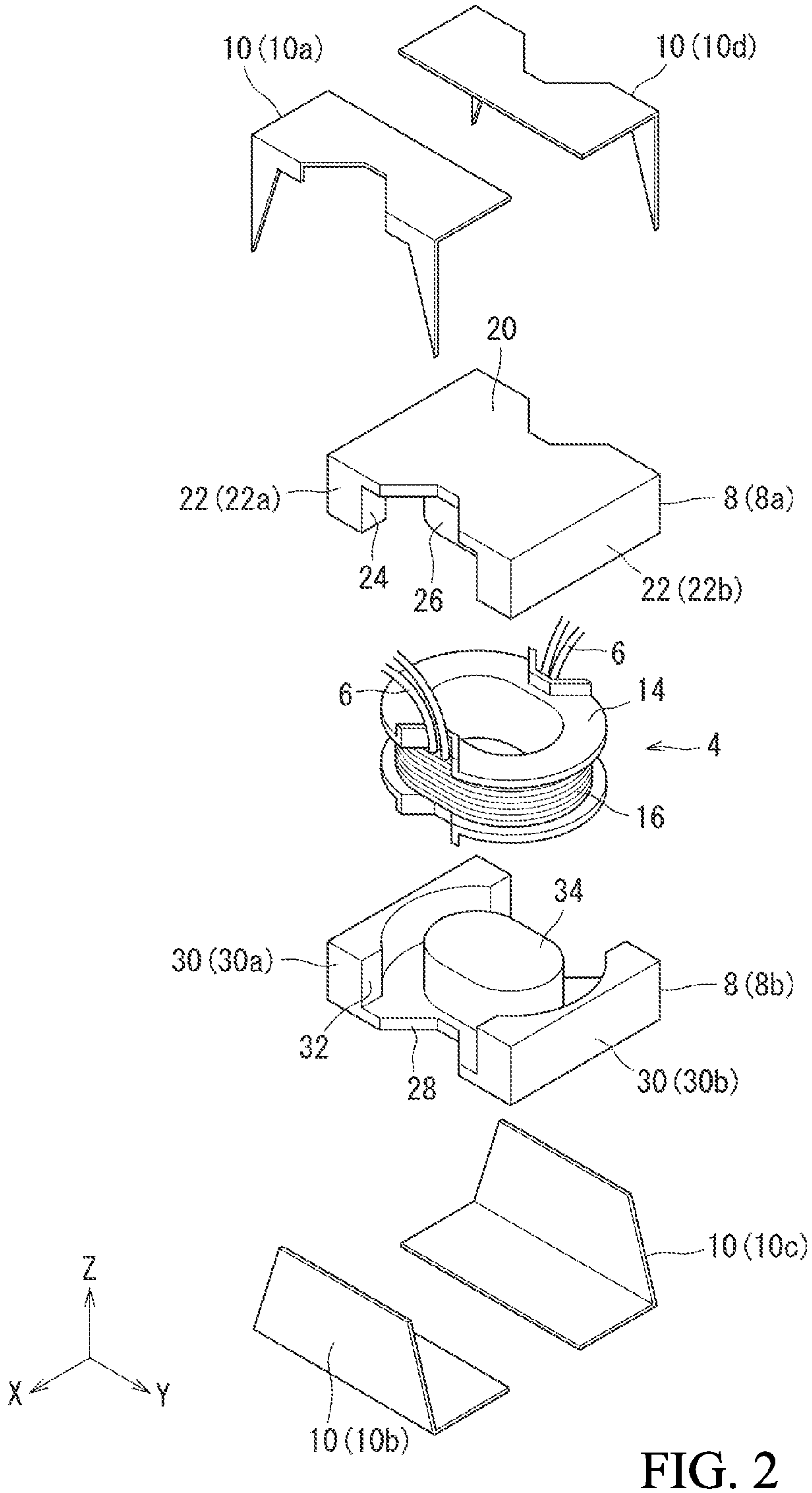
FIG. 2 is an exploded perspective view of the transformer of FIG. 1.

FIG. 1 is a perspective view showing a transformer 2 according to one embodiment. FIG. 2 is an exploded perspective view of the transformer 2 of FIG. 1. In FIG. 1, the arrow X indicates the forward direction with respect to the transformer 2. The opposite direction is the rearward direction. The arrow Y indicates the rightward direction with respect to the transformer 2. The opposite direction is the leftward direction. The arrow Z indicates the upward direction with respect to the transformer 2. The opposite direction is the downward direction. As shown in FIGS. 1 and 2, the transformer 2 includes a coil 4, a pair of signal lines 6, a core 8, a plurality of radiator plates 10, and a tape 12. In FIG. 2, the tape 12 is omitted. The transformer 2 further includes an unshown filler in a gap between the core 8 and the coil 4.

The coil 4 includes a bobbin 14 and a wire 16. The bobbin 14 is annular. Although not shown, the wire 16 includes a first wire and a second wire. The first wire is wound on the outer circumference of the bobbin 14 to form a primary coil. The second wire is wound on the outer circumference of the bobbin 14 to form a secondary coil.

The pair of signal lines 6 are electrically connected to the wire 16 of the coil 4. Each of the signal lines 6 includes a first signal line connected to the first wire and a second signal line connected to the second wire. A current is supplied to the primary coil through the first signal line, and a current generated in the secondary coil is output through the second signal line.

Figure 3A:
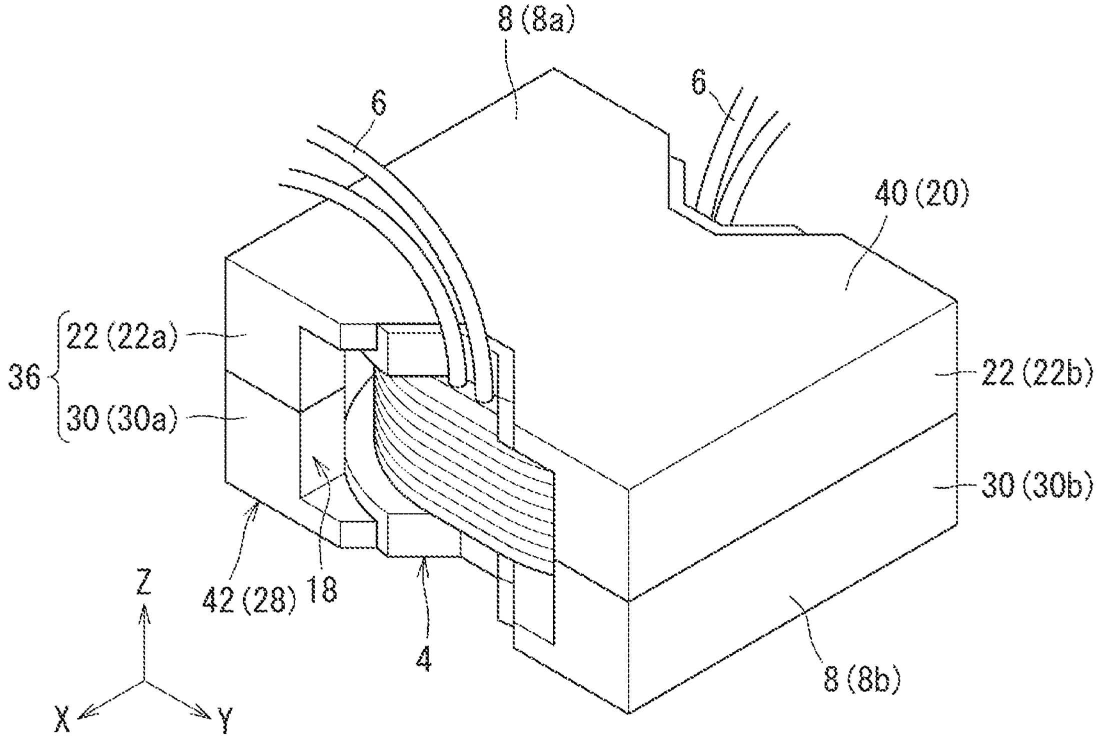
FIG. 3A is a perspective view showing the coil and core of FIG. 2.
Figure 3B:
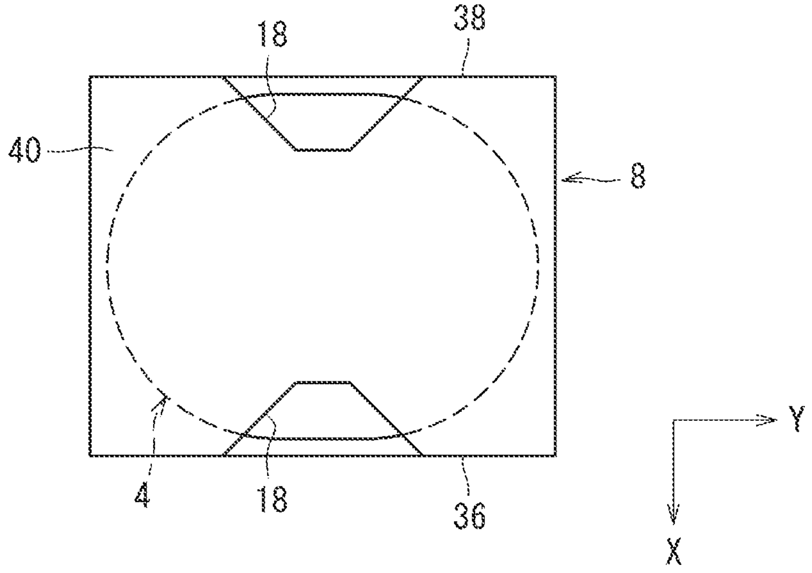
FIG. 3B is a plan view of the coil and core.

The core 8 encloses the coil 4. FIG. 3A is a perspective view showing the coil 4, the core 8, and the signal lines 6, and FIG. 3B is a plan view of the coil 4 and core 8. In this embodiment, the core 8 is box-shaped. The core 8 includes openings 18 at front and rear surfaces 36 and 38. The coil 4 is exposed through each of the openings 18. The core 8 is made of a magnetic material. In this embodiment, the core 8 is made of ferrite. The material of the core 8 may be silicon steel.

As shown in FIG. 2, the core 8 includes a first half 8*a* and a second half 8*b*. The first half 8*a* includes a top surface 20, four side surfaces 22 (a first side surface 22*a*, a second side surface 22*b*, a third side surface, and a fourth side surface) continuous with the top surface 20, and a core portion 26. In each of the first side surface 22*a* and the third side surface there is a cut 24 extending from one end adjacent to the top surface 20 to the opposite end. The core portion 26 extends downward from the center of the top surface 20.

The second half 8*b* includes a bottom surface 28, four side surfaces 30 (a first side surface 30*a*, a second side surface 30*b*, a third side surface, and a fourth side surface) continuous with the bottom surface 28, and a core portion 34. In each of the first side surface 30*a* and the third side surface there is a cut 32 extending from one end adjacent to the bottom surface 28 to the opposite end. The core portion 34 extends upward from the center of the bottom surface 28. In this embodiment, the second half 8*b* has the same shape as the first half 8*a*.

The coil 4 is fitted around the core portion 34 of the second half 8*b*. The first half 8*a* is placed on the second half 8*b*. Thus, the coil 4 is enclosed in the core 8. The core portion 26 of the first half 8*a* and the core portion 34 of the second half 8*b* constitute a core portion of the core 8. The first side surface 22*a* of the first half 8*a* and the first side surface 30*a* of the second half 8*b* constitute the front surface 36 of the core 8. The cut 24 of the first side surface 22*a* of the first half 8*a* and the cut 32 of the first side surface 30*a* of the second half 8*b* form the above-mentioned opening 18 of the front surface 36 of the core 8. Likewise, the third side surface of the first half 8*a* and the third side surface of the second half 8*b* constitute the rear surface 38 of the core 8. The cut of the third side surface of the first half 8*a* and the cut of the third side surface of the second half 8*b* form the opening 18 of the rear surface 38 of the core 8. One of the pair of signal lines 6 is led out through the opening 18 of the front surface 36, and the other signal line 6 is led out through the opening 18 of the rear surface 38.

As shown in FIG. 3B, the coil 4 is exposed through the openings 18 of the front and rear surfaces 36 and 38 of the core 8. The coil 4 does not project forward beyond the front surface 36 of the core 8. The coil 4 does not project rearward beyond the rear surface 38 of the core 8.

Figure 4A:
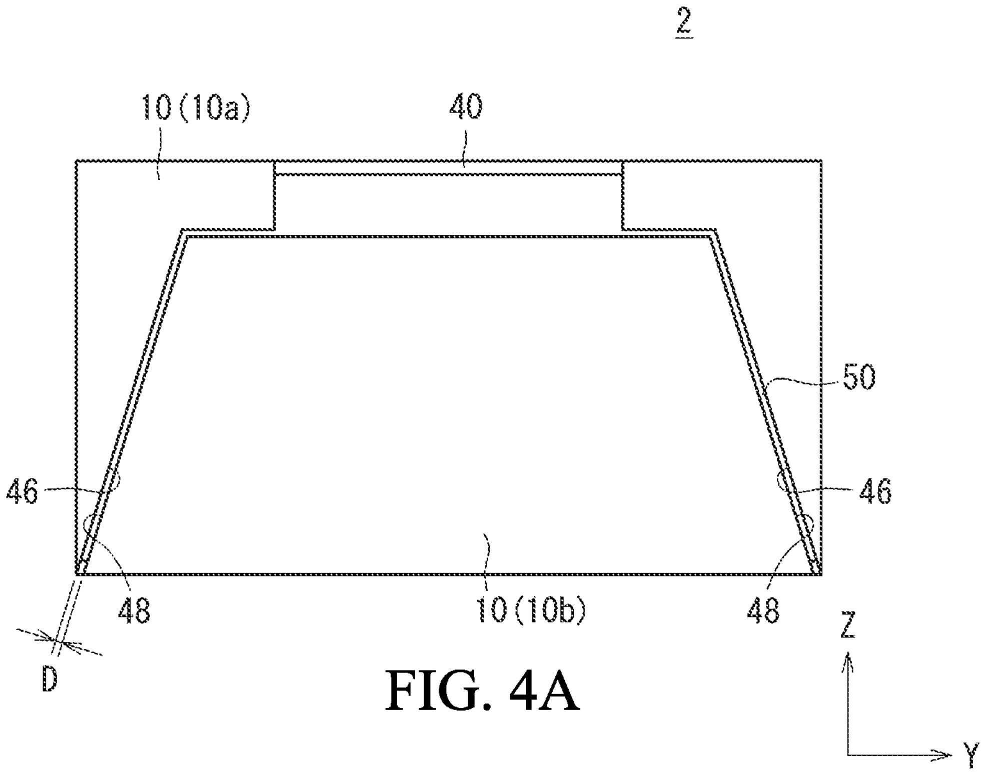
FIG. 4A is a front view of the transformer of FIG. 1.
Figure 4B:
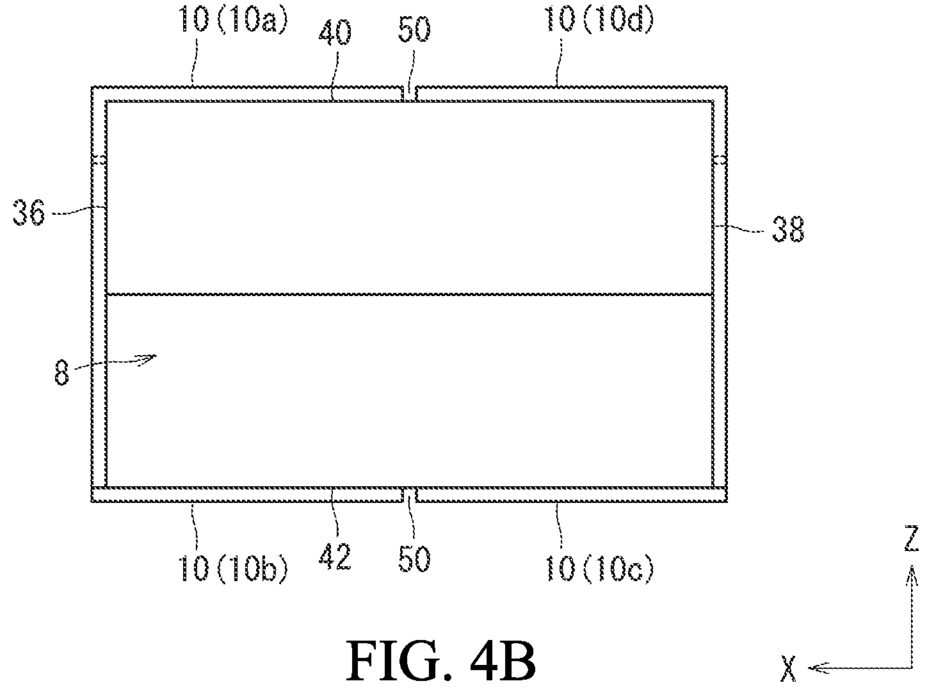
FIG. 4B is a side view of the transformer of FIG. 1.

FIG. 4A is a front view of the transformer 2, and FIG. 4B is a right side view of the transformer 2. In FIGS. 4A and 4B, only the core 8 and radiator plates 10 are shown. Each of the radiator plates 10 covers a part of the core 8. In this embodiment, as shown in FIG. 2 and FIG. 4B, the radiator plates 10 include a first bent radiator plate 10*a*, a second bent radiator plate 10*b*, a third bent radiator plate 10*c*, and a fourth bent radiator plate 10*d*. The first bent radiator plate 10*a* covers the top and front surfaces 40 and 36 of the core 8. The second bent radiator plate 10*b* covers the front and bottom surfaces 36 and 42. The third bent radiator plate 10*c* covers the bottom and rear surfaces 42 and 38. The fourth bent radiator plate 10*d* covers the rear and top surfaces 38 and 40. The first, second, third, and fourth bent radiator plates 10*a*, 10*b*, 10*c*, and 10*d* cover the core 8 without overlapping one another. The first and fourth bent radiator plates 10*a* and 10*d* have the same shape. The second and third bent radiator plates 10*b* and 10*c* have the same shape. The first, second, third, and fourth bent radiator plates 10*a*, 10*b*, 10*c*, and 10*d* are L-shaped in a side view.

As shown in FIG. 1, the first bent radiator plate 10*a* includes an outlet 44 at a location corresponding to the location of an end of the opening 18 of the front surface 36 of the core 8, the end of the opening 18 being adjacent to the top surface 40. One of the signal lines 6 is led out through the opening 18 of the front surface 36 and the outlet 44. The fourth bent radiator plate 10*d* includes an outlet 44 at a location corresponding to the location of an end of the opening 18 of the rear surface 38 of the core 8, the end of the opening 18 being adjacent to the top surface 40. The other signal line 6 is led out through the opening 18 of the rear surface 38 and the outlet 44.

In a front view, as shown in FIG. 4A, the side of the first bent radiator plate 10*a* that faces the second bent radiator plate 10*b* (the lower side of the first bent radiator plate 10*a*) includes an inclined portion 46 inclined with respect to the leftward/rightward direction (i.e., with respect to the side of the front surface 36 that is adjacent to the top surface 40). In this embodiment, the lower side of the first bent radiator plate 10*a* includes two inclined portions 46. In the front view, the side of the second bent radiator plate 10*b* that faces the first bent radiator plate 10*a* (the upper side of the second bent radiator plate 10*b*) includes an inclined portion 48 inclined with respect to the leftward/rightward direction. In this embodiment, the upper side of the second bent radiator plate 10*b* includes two inclined portions 48. Each of the inclined portions 46 of the first bent radiator plate 10*a* extends parallel to a corresponding one of the inclined portions 48 of the second bent radiator plate 10*b*. In this embodiment, there is a gap 50 between each of the inclined portions 46 of the first bent radiator plate 10*a* and a corresponding one of the inclined portions 48 of the second bent radiator plate 10*b*.

In a rear view, although not shown, the side of the third bent radiator plate 10*c* that faces the fourth bent radiator plate 10*d* (the upper side of the third bent radiator plate 10*c*) includes inclined portions inclined with respect to the leftward/rightward direction. In the rear view, the side of the fourth bent radiator plate 10*d* that faces the third bent radiator plate 10*c* (the lower side of the fourth bent radiator plate 10*d*) includes inclined portions inclined with respect to the leftward/rightward direction. Each of the inclined portions of the third bent radiator plate 10*c* extends parallel to a corresponding one of the inclined portions of the fourth bent radiator plate 10*d*. In this embodiment, there is a gap between each of the inclined portions of the third bent radiator plate 10*c* and a corresponding one of the inclined portions of the fourth bent radiator plate 10*d*.

In this embodiment, in a plan view, the side of the first bent radiator plate 10*a* that faces the fourth bent radiator plate 10*d* (the rear side of the first bent radiator plate 10*a*) is parallel to the leftward/rightward direction. In the plan view, the side of the fourth bent radiator plate 10*d* that faces the first bent radiator plate 10*a* (the front side of the fourth bent radiator plate 10*d*) is parallel to the leftward/rightward direction. There is a gap 50 between the rear side of the first bent radiator plate 10*a* and the front side of the fourth bent radiator plate 10*d*. The rear side of the first bent radiator plate 10*a* may include an inclined portion inclined with respect to the leftward/rightward direction. The front side of the fourth bent radiator plate 10*d* may include an inclined portion inclined with respect to the leftward/rightward direction.

In this embodiment, in a bottom view, although not shown, the side of the second bent radiator plate 10*b* that faces the third bent radiator plate 10*c* (the rear side of the second bent radiator plate 10*b*) is parallel to the leftward/ rightward direction. The side of the third bent radiator plate 10*c* that faces the second bent radiator plate 10*b* (the front side of the third bent radiator plate 10*c*) is parallel to the leftward/rightward direction. There is a gap 50 between the rear side of the second bent radiator plate 10*b* and the front side of the third bent radiator plate 10*c*. The rear side of the second bent radiator plate 10*b* may include an inclined portion inclined with respect to the leftward/rightward direction. The front side of the third bent radiator plate 10*c* may include an inclined portion inclined with respect to the leftward/rightward direction.

Each of the radiator plates 10 is made of a thermally-conductive metal. Typical examples of the material of the radiator plates 10 include SUS301, SUS304, C5191, and C521. In the present specification, stating that a material is "thermally-conductive" means that the thermal conductivity of the material is 10 W/(m·K) or more. The letter "W" denotes electric power (watt), "m" denotes distance (meter), and "K" denotes temperature (kelvin).

In this embodiment, each of the radiator plates is attached to the core 8 with the tape 12. The radiator plates 10 may be attached to the core 8 by winding a shrinkable tube around the radiator plates 10.

Although not shown, a filler made of resin is located between the inner surfaces of the core 8 and the coil 4. The gap between the inner surfaces of the core 8 and the coil 4 is filled with the filler. The filler is formed by pouring a resin into the core 8 through the outlet 44 of the front surface 36 or rear surface 38 and solidifying the resin. Preferred examples of the resin include epoxy resins and silicone resins.

The following will describe advantageous effects of the present embodiment.

In a transformer in which one radiator plate covers three successively adjoining surfaces of a core (e.g., top, front, and bottom surfaces), the difference between the "distance between the top and bottom surfaces of the core" and the "distance between a portion of the radiator plate that covers the top surface and a portion of the radiator plate that covers the bottom surface" could be increased due to reasons such as the manufacturing tolerances of the core and the radiator plate and the difference in thermal expansion coefficient between the core and the radiator plate. The difference in distance could cause a gap between the top or bottom surface and the radiator plate. The gap could cause a decline in heat radiation performance of the transformer.

In the transformer 2 of this embodiment, the top surface 40 is covered by the first and fourth bent radiator plates 10*a* and 10*d*, and the bottom surface 42 is covered by the second and third bent radiator plates 10*b* and 10*c*. The top and bottom surfaces 40 and 42 are covered by different radiator plates 10. Thus, even if the "distance between the top and bottom surfaces 40 and 42 of the core 8" deviates from a given value due to reasons such as manufacturing tolerances and thermal expansion, the top surface 40 can be in close contact with the first and fourth bent radiator plates 10*a* and 10*d*, and the bottom surface 42 can be in close contact with the second and third bent radiator plates 10*b* and 10*c*. In the transformer 2, little or no gap occurs between the top surface 40 and the first and fourth bent radiator plates 10*a* and 10*d* or between the bottom surface 42 and the second and third bent radiator plates 10*b* and 10*c*. The transformer 2 exhibits high heat radiation performance.

In the transformer 2 of this embodiment, the front surface 36 is covered by the first and second bent radiator plates 10*a* and 10*b*, and the rear surface 38 is covered by the third and fourth bent radiator plates 10*c* and 10*d*. The front and rear surfaces 36 and 38 are covered by different radiator plates 10. Thus, even if the "distance between the front and rear surfaces 36 and 38 of the core 8" deviates from a given value due to reasons such as manufacturing tolerances and thermal expansion, the front surface 36 can be in close contact with the first and second bent radiator plates 10*a* and 10*b*, and the rear surface 38 can be in close contact with the third and fourth bent radiator plates 10*c* and 10*d*. In the transformer 2, little or no gap occurs between the front surface 36 and the first and second bent radiator plates 10*a* and 10*b* or between the rear surface 38 and the third and fourth bent radiator plates 10*c* and 10*d*. The transformer 2 exhibits high heat radiation performance.

In the transformer 2 of this embodiment, the first bent radiator plate 10*a* covers the top and front surfaces 40 and 36 of the core 8. In other words, the first bent radiator plate 10*a* includes a first portion covering the top surface 40 and a second portion covering the front surface 36. By adjusting the angle between the first and second portions of the first bent radiator plate 10*a* to the angle between the top and front surfaces 40 and 36, the first bent radiator plate 10*a* can easily be placed in close contact with the top and front surfaces 40 and 36.

Likewise, in this embodiment, the second bent radiator plate 10*b* can easily be placed in close contact with the front and bottom surfaces 36 and 42 by adjusting the angle between the first and second portions of the second bent radiator plate 10*b* to the angle between the front and bottom surfaces 36 and 42. By adjusting the angle between the first and second portions of the third bent radiator plate 10*c* to the angle between the rear and bottom surfaces 38 and 42, the third bent radiator plate 10*c* can easily be placed in close contact with the rear and bottom surfaces 38 and 42. By adjusting the angle between the first and second portions of the fourth bent radiator plate 10*d* to the angle between the top and rear surfaces 40 and 38, the fourth bent radiator plate 10*d* can easily be placed in close contact with the top and rear surfaces 40 and 38.

Conventionally, a thermally-conductive material such as thermally-conductive grease, sheet, or resin may be disposed between a core and a radiator plate in order to prevent a decline in heat radiation performance caused by a gap between the core and the radiator plate. In the transformer 2, in which little or no gap occurs between the core 8 and the radiator plates 10, there is no need to dispose any thermally-conductive material between the core 8 and the radiator plates 10, or the amount of the thermally-conductive material used is reduced. The transformer 2 has a reduced cost.

Preferably, in a front view, the lower side of the first bent radiator plate 10*a* includes an inclined portion 46, the upper side of the second bent radiator plate 10*b* includes an inclined portion 48, and the inclined portions 46 and 48 face each other. The lower side of the first bent radiator plate 10*a* and the upper side of the second bent radiator plate 10*b* are likely to be displaced in the upward/downward direction due to thermal expansion or manufacturing tolerances. When the lower side of the first bent radiator plate 10*a* and the upper side of the second bent radiator plate 10*b* respectively include the inclined portions 46 and 48 which face each other, the minimum distance between the lower and upper sides (this distance is denoted by "D" in FIG. 4A) is smaller than a length over which the lower and upper sides are displaced away from each other in the upward/downward direction. Furthermore, when there are the inclined portions 46 and 48, the length over which the lower side of the first bent radiator plate 10*a* and the upper side of the second bent radiator plate 10*b* face each other can be longer than when the lower side of the first bent radiator plate 10a and the upper side of the second bent radiator plate 10b extend in the leftward/rightward direction. This contributes to high heat radiation performance.

The thickness T of each of the radiator plates is preferably 0.1 mm or more. When the thickness T is 0.1 mm or more, excellent heat radiation performance can be achieved. From this viewpoint, the thickness T is more preferably 0.2 mm or more. The thickness T is preferably 2.0 mm or less. When the thickness T is 2.0 mm or less, the radiator plate 10 is easily deformable. Such a radiator plate 10 can easily be placed in close contact with the core 8. From this viewpoint, the thickness T is more preferably 0.4 mm or less.

Preferably, as shown in FIG. 3B, the coil 4 does not project forward beyond the front surface 36 of the core 8. In such a case, the radiator plates 10 can easily be placed in close contact with the front surface 36 of the core 8. Preferably, the coil 4 does not project rearward beyond the rear surface 38 of the core 8. In such a case, the radiator plates 10 can easily be placed in close contact with the rear surface 38 of the core 8. This contributes to high heat radiation performance. Additionally, leakage of the filler poured through either of the outlets 44 is prevented.

Preferably, the first and second halves 8a and 8b of the core 8 have the same shape. In such a case, the first and second halves 8a and 8b can be embodied by components of the same type. This makes manufacturing of the core 8 easier.

Preferably, the first bent radiator plate 10a includes an outlet 44 at a location corresponding to the location of an end of the opening 18 of the front surface 36 of the core 8, the end of the opening 18 being adjacent to the top surface 40. Preferably, the fourth bent radiator plate 10d includes an outlet 44 at a location corresponding to the location of an end of the opening 18 of the rear surface 38 of the core 8, the end of the opening 18 being adjacent to the top surface 40. In such a case, the signal lines 6 can easily be led out, and the filler can easily be poured into the gap between the core 8 and the coil 4. Furthermore, pouring a thermally-conductive resin as a filler through either of the outlets 44 makes it possible to effect heat radiation via the wires and signal lines.

Figure 5:
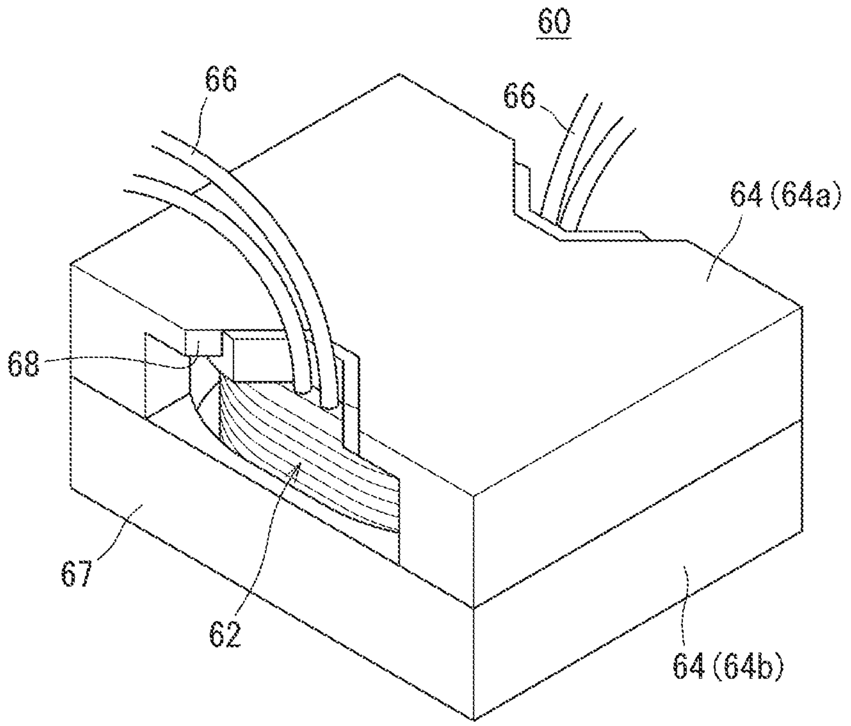
FIG. 5 is a perspective view showing a coil and core of a transformer according to another embodiment.

FIG. 5 is a perspective view showing a coil 62, a core 64, and signal lines 66 of a transformer 60 according to another embodiment. In the core 64, there are no cuts in a first side surface 67 and a third side surface of a second half 64b. The structure of the transformer 60 is the same as that of the transformer 2 of FIG. 1, except that the second half 64b includes no cuts.

In the transformer 60, in which the second half 64b includes no cuts, a filler poured through an outlet of a radiator plate and a cut 68 of a first half 64a is not likely to leak out. The filler efficiently fills the gap between the core 64 and the coil 62. The transformer 60 has a reduced manufacturing cost.

FIGS. 6A to 6D and FIGS. 7A and 7B are schematic views showing transformers according to still other embodiments. These figures are side views of the transformers. In these figures, only the core and radiator plates are shown. The cores of the transformers are the same as the core 8 of FIG. 4, and thus the elements of the cores are denoted by the same reference signs as those of the core 8 of FIG. 4.

Figures 6A, 6B, 6C, 6D:
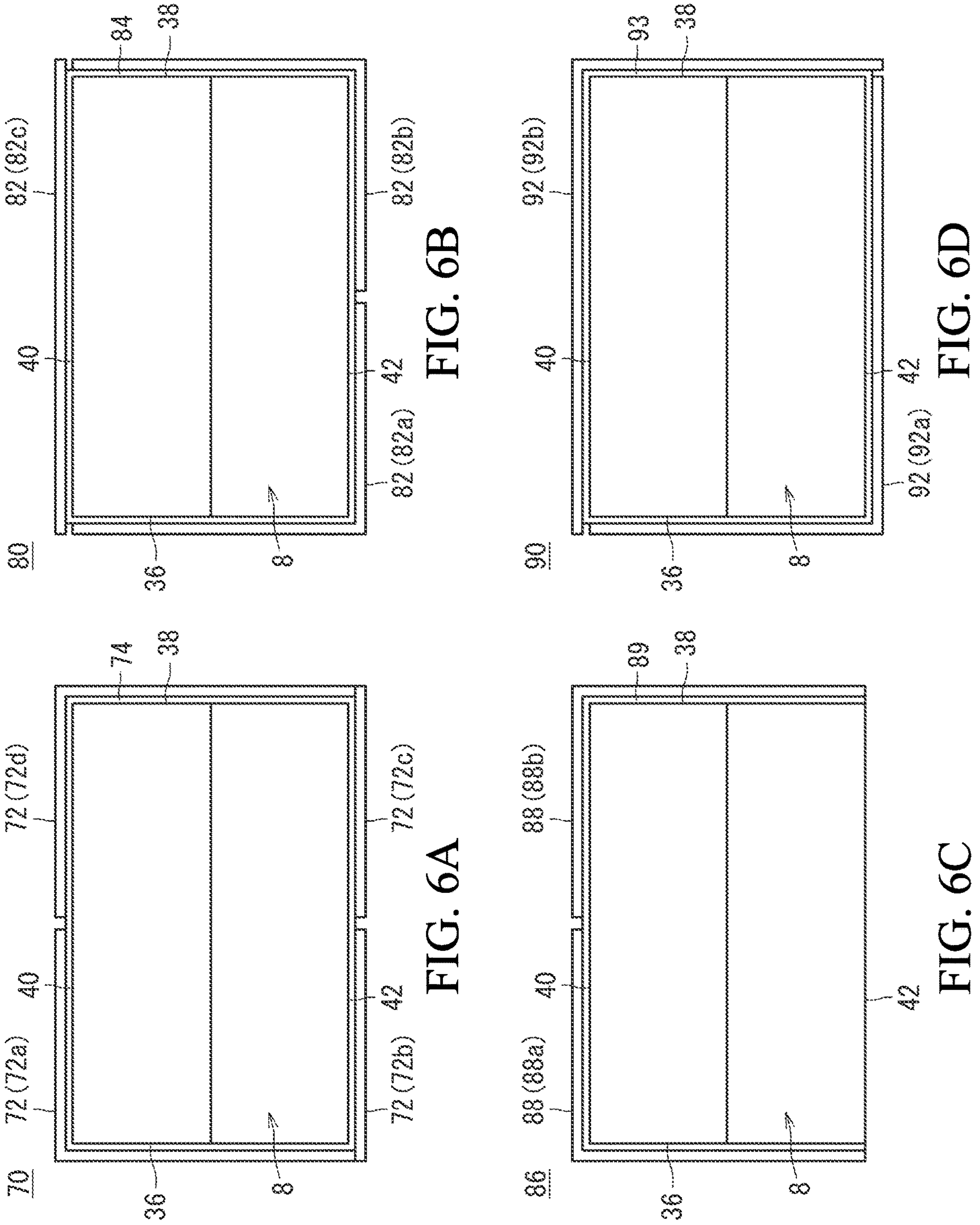
FIGS. 6A, 6B, 6C, and 6D are schematic views each of which shows a side surface of a corresponding one of transformers according to still other embodiments.

The transformer 70 of the embodiment of FIG. 6A includes a first bent radiator plate 72a, a second bent radiator plate 72b, a third bent radiator plate 72c, and a fourth bent radiator plate 72d. The shape of each of the radiator plates 72 of the transformer 70 of FIG. 6A is the same as the shape of a corresponding one of the radiator plates 10 of the transformer 2 of FIG. 4. The transformer 70 of FIG. 6A differs from the transformer 2 of FIG. 4 in that a thermally-conductive sheet 74 is located between the core 8 and the radiator plates 72. The core 8 and the radiator plates 72 are in indirect contact via the thermally-conductive sheet 74.

In this embodiment, the thermally-conductive sheet 74 is located between the core 8 and the radiator plates 72. This effectively prevents or reduces the occurrence of any gap between the core 8 and the radiator plates 72. Additionally, as the thermally-conductive sheet 74 covers the openings 18 of the front and rear surfaces 36 and 38, the filler poured through an outlet is not likely to leak out. The transformer 60 has a reduced manufacturing cost.

The transformer 80 of the embodiment of FIG. 6B includes a first bent radiator plate 82a, a second bent radiator plate 82b, and a flat radiator plate 82c. The first bent radiator plate 82a covers the front and bottom surfaces 36 and 42. The first bent radiator plate 82a covers the entire front surface 36. The second bent radiator plate 82b covers the bottom and rear surfaces 42 and 38. The second bent radiator plate 82b covers the entire rear surface 38. The flat radiator plate 82c covers the top surface 40. The first bent radiator plate 82a, second bent radiator plate 82b, and flat radiator plate 82c cover the core 8 without overlapping one another. Thermally-conductive grease 84 is located between each of the radiator plates 82 and the core 8.

In the transformer 80 of this embodiment, the top surface 40 is covered by the flat radiator plate 82c, and the bottom surface 42 is covered by the first and second bent radiator plates 82a and 82b. The top and bottom surfaces 40 and 42 are covered by different radiator plates 82. Thus, the top surface 40 can be in close contact with the flat radiator plate 82c, and the bottom surface 42 can be in close contact with the first and second bent radiator plates 82a and 82b. In the transformer 80, little or no gap occurs between the top surface 40 and the flat radiator plate 82c or between the bottom surface 42 and the first and second bent radiator plates 82a and 82b. The transformer 80 exhibits high heat radiation performance.

In the transformer 80 of this embodiment, the front surface 36 is covered by the first bent radiator plate 82a, and the rear surface 38 is covered by the second bent radiator plate 82b. The front and rear surfaces 36 and 38 are covered by different radiator plates 82. Thus, the front surface 36 can be in close contact with the first bent radiator plate 82a, and the rear surface 38 can be in close contact with the second bent radiator plate 82b. In the transformer 80, little or no gap occurs between the front surface 36 and the first bent radiator plate 82a or between the rear surface 38 and the second bent radiator plate 82b. The transformer 80 exhibits high heat radiation performance.

In this embodiment, the thermally-conductive grease 84 is located between the core 8 and the radiator plates 82. This effectively prevents or reduces the occurrence of any gap between the core 8 and the radiator plates 82.

The transformer 86 of the embodiment of FIG. 6C includes a first bent radiator plate 88a and a second bent radiator plate 88b. The first bent radiator plate 88a covers the top and front surfaces 40 and 36. The first bent radiator plate 88a covers the entire front surface 36. The second bent radiator plate 88b covers the top and rear surfaces 40 and 38. The second bent radiator plate 88b covers the entire rear surface 38. The first and second bent radiator plates 88a and 88b cover the core 8 without overlapping each other. There is no radiator plate covering the bottom surface 42. A thermally-conductive adhesive 89 is located between each of the radiator plates 88 and the core 8.

In the transformer 86 of this embodiment, the front surface 36 is covered by the first bent radiator plate 88*a*, and the rear surface 38 is covered by the second bent radiator plate 88*b*. The front and rear surfaces 36 and 38 are covered by different radiator plates 88. Thus, the front surface 36 can be in close contact with the first bent radiator plate 88*a*, and the rear surface 38 can be in close contact with the second bent radiator plate 88*b*. In the transformer 86, little or no gap occurs between the front surface 36 and the first bent radiator plate 88*a* or between the rear surface 38 and the second bent radiator plate 88*b*. The transformer 86 exhibits high heat radiation performance.

In the transformer 86 of this embodiment, the top surface 40 is covered by the first and second bent radiator plates 88*a* and 88*b*, and there is no radiator plate covering the bottom surface 42. Both the first and second bent radiator plates 88*a* and 88*b* do not cover the bottom surface 42. Even if the "distance between the top and bottom surfaces 40 and 42 of the core 8" deviates from a given value due to reasons such as manufacturing tolerances and thermal expansion, the top surface 40 can be in close contact with the first and second bent radiator plates 88*a* and 88*b*. In the transformer 86, little or no gap occurs between the top surface 40 and the first and second bent radiator plates 88*a* and 88*b*.

In the transformer 86 of this embodiment, there is no radiator plate covering the bottom surface 42. The transformer 86 may be placed on a substrate having high heat radiation performance. In this case, heat from the bottom surface 42 is radiated through the substrate. The transformer 86 exhibits high heat radiation performance and requires a reduced number of radiator plates 88.

In this embodiment, the thermally-conductive adhesive 89 is located between the core 8 and the radiator plates 88. This effectively prevents or reduces the occurrence of any gap between the core 8 and the radiator plates 82. Additionally, the thermally-conductive adhesive 89 effectively prevents displacement of the radiator plates 82 or detachment of the radiator plates 82 from the core 8.

The transformer 90 of the embodiment of FIG. 6D includes a first bent radiator plate 92*a* and a second bent radiator plate 92*b*. The first bent radiator plate 92*a* covers the front and bottom surfaces 36 and 42. The first bent radiator plate 92*a* covers the entire front and bottoms surfaces 36 and 42. The second bent radiator plate 92*b* covers the rear and top surfaces 38 and 40. The second bent radiator plate 92*b* covers the entire rear and top surfaces 38 and 40. A thermally-conductive adhesive 93 is located between each of the radiator plates 92 and the core 8.

In the transformer 90 of this embodiment, the front surface 36 is covered by the first bent radiator plate 92*a*, and the rear surface 38 is covered by the second bent radiator plate 92*b*. The front and rear surfaces 36 and 38 are covered by different radiator plates 92. Thus, the front surface 36 can be in close contact with the first bent radiator plate 92*a*, and the rear surface 38 can be in close contact with the second bent radiator plate 92*b*. In the transformer 90, little or no gap occurs between the front surface 36 and the first bent radiator plate 92*a* or between the rear surface 38 and the second bent radiator plate 92*b*. The transformer 90 exhibits high heat radiation performance.

In the transformer 90 of this embodiment, the bottom surface 42 is covered by the first bent radiator plate 92*a*, and the top surface 40 is covered by the second bent radiator plate 92*b*. The bottom and top surfaces 42 and 40 are covered by different radiator plates 92. Thus, the bottom surface 42 can be in close contact with the first bent radiator plate 92*a*, and the top surface 40 can be in close contact with the second bent radiator plate 92*b*. In the transformer 90, little or no gap occurs between the bottom surface 42 and the first bent radiator plate 92*a* or between the top surface 40 and the second bent radiator plate 92*b*. The transformer 90 exhibits high heat radiation performance.

Figure 7A:
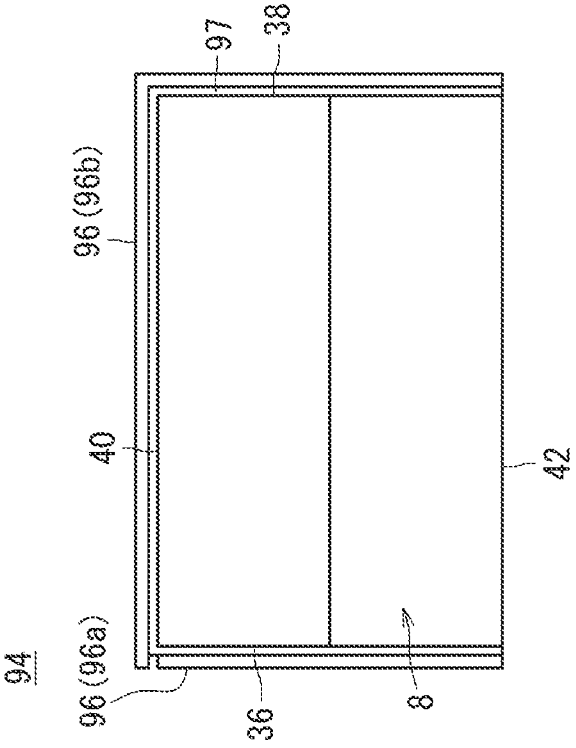
FIGS. 7A and 7B are schematic views each of which shows a side surface of a corresponding one of transformers according to still other embodiments.

The transformer 94 of the embodiment of FIG. 7A includes a flat radiator plate 96*a* and a bent radiator plate 96*b*. The flat radiator plate 96*a* covers the front surface 36. The flat radiator plate 96*a* covers the entire front surface 36. The bent radiator plate 96*b* covers the top and rear surfaces 40 and 38. The bent radiator plate 96*b* covers the entire top and rear surfaces 40 and 38. A thermally-conductive adhesive 97 is located between each of the radiator plates 96 and the core 8.

In the transformer 94 of this embodiment, the front surface 36 is covered by the flat radiator plate 96*a*, and the rear surface 38 is covered by the bent radiator plate 96*b*. The front and rear surfaces 36 and 38 are covered by different radiator plates 96. Thus, the front surface 36 can be in close contact with the flat radiator plate 96*a*, and the rear surface 38 can be in close contact with the bent radiator plate 96*b*. In the transformer 94, little or no gap occurs between the front surface 36 and the flat radiator plate 96*a* or between the rear surface 38 and the bent radiator plate 96*b*. The transformer 94 exhibits high heat radiation performance.

In the transformer 94 of this embodiment, the top surface 40 is covered by the bent radiator plate 96*b*, and there is no radiator plate covering the bottom surface 42. The bent radiator plate 96*b* does not cover the bottom surface 42. Even if the "distance between the top and bottom surfaces 40 and 42 of the core 8" deviates from a given value due to reasons such as manufacturing tolerances and thermal expansion, the top surface 40 can be in close contact with the bent radiator plate 96*b*. In the transformer 94, little or no gap occurs between the top surface 40 and the bent radiator plate 96*b*. The transformer 94 exhibits high heat radiation performance.

Figure 7B:
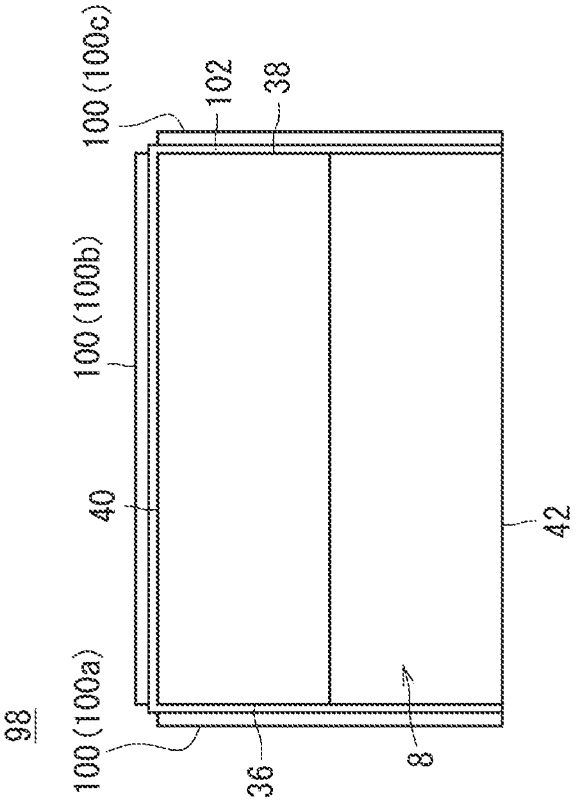

The transformer 98 of the embodiment of FIG. 7B includes a first flat radiator plate 100*a*, a second flat radiator plate 100*b*, and a third flat radiator plate 100*c*. The first flat radiator plate 100*a* covers the front surface 36. The first flat radiator plate 100*a* covers the entire front surface 36. The second flat radiator plate 100*b* covers the top surface 40. The second flat radiator plate 100*b* covers the entire top surface 40. The third flat radiator plate 100*c* covers the rear surface 38. The third flat radiator plate 100*c* covers the entire rear surface 38. There is no radiator plate covering the bottom surface 42. A thermally-conductive adhesive 102 is located between each of the radiator plates 100 and the core 8.

In the transformer 98 of this embodiment, the front surface 36 is covered by the first flat radiator plate 100*a*, and the rear surface 38 is covered by the third flat radiator plate. The front and rear surfaces 36 and 38 are covered by different radiator plates 100. Thus, the front surface 36 can be in close contact with the first flat radiator plate 100*a*, and the rear surface 38 can be in close contact with the third flat radiator plate 100*c*. In the transformer 98, little or no gap occurs between the front surface 36 and the first flat radiator plate 100*a* or between the rear surface 38 and the third flat radiator plate 100*c*. The transformer 98 exhibits high heat radiation performance.

In the transformer 98 of this embodiment, the top surface 40 is covered by the second flat radiator plate 100*b*, and there is no radiator plate covering the bottom surface 42. Thus, the top surface 40 can be in close contact with the second flat radiator plate 100*b*. In the transformer 98, little or no gap occurs between the top surface 40 and the second flat radiator plate 100*b*. The transformer 98 exhibits high heat radiation performance.

In the transformers of the embodiments described above, the coil does not project forward beyond the front surface of the core, and does not project rearward beyond the rear surface of the core. Although not shown, the coil may project forward beyond the front surface of the core or rearward beyond the rear surface of the core. In such a case, a thermally-conductive sheet is preferably located between the core and the radiator plates. The thermally-conductive sheet can cover the front or rear surface of the core even in the case where the coil projects beyond the front or rear surface of the core. This prevents the filler poured between the coil and the core from leaking out.

In the embodiments described above, the right and left side surfaces of the transformer are not covered by any radiator plates. The right and left side surfaces of the transformer may be covered by radiator plates. For example, the right side, top, and left side surfaces of the transformer may be covered by radiator plates. In this case, the right and left side surfaces are preferably covered by different radiator plates.

In the transformer of the present invention, as described above, little or no gap occurs between the radiator plates and the core. This demonstrates the superiority of the present invention.

DISCLOSED ITEMS

The following items are disclosures of preferred embodiments.

Item 1

A transformer including:
- a coil;
- a core enclosing the coil, the core including a first surface, a second surface adjoining the first surface, and a third surface opposite to the first surface and adjoining the second surface; and
- a plurality of radiator plates each of which covers a part of the core, wherein
- the first and third surfaces are covered by different radiator plates of the plurality of radiator plates.

Item 2

The transformer according to item 1, wherein
- the plurality of radiator plates include a first bent radiator plate covering the first and second surfaces and a second bent radiator plate covering the second and third surfaces, and
- the first and second bent radiator plates cover the second surface without overlapping each other.

Item 3

The transformer according to item 2, wherein in a front view of the second surface, a side of the first bent radiator plate that faces the second bent radiator plate and a side of the second bent radiator plate that faces the first bent radiator plate include inclined portions that are inclined with respect to a side of the second surface that is adjacent to the first surface.

Item 4

The transformer according to item 2 or 3, wherein
- the first bent radiator plate covers the entire first surface, and
- the second bent radiator plate covers the entire third surface.

Item 5

The transformer according to item 1, wherein the plurality of radiator plates include a first bent radiator plate covering the first and second surfaces and a flat radiator plate covering the third surface.

Item 6

The transformer according to item 1, wherein the plurality of radiator plates include a first flat radiator plate covering the first surface, a second flat radiator plate covering the second surface, and a third flat radiator plate covering the third surface.

Item 7

The transformer according to any one of items 1 to 6, wherein
- the core further includes a fourth surface opposite to the second surface and adjoining the third surface, and
- the second and fourth surfaces are covered by different radiator plates of the plurality of radiator plates.

Item 8

The transformer according to item 7, wherein
- the plurality of radiator plates include a first bent radiator plate covering the first and second surfaces, a second bent radiator plate covering the second and third surfaces, a third bent radiator plate covering the third and fourth surfaces, and a fourth bent radiator plate covering the fourth and first surfaces, and
- the first, second, third, and fourth bent radiator plates do not overlap one another.

Item 9

The transformer according to item 7, wherein the plurality of radiator plates include a first bent radiator plate covering the first and second surfaces and a second bent radiator plate covering the third and fourth surfaces.

Item 10

The transformer according to item 7, wherein the plurality of radiator plates include a first bent radiator plate covering the first and second surfaces, a second bent radiator plate covering the second and third surfaces, and a flat radiator plate covering the fourth surface.

Item 11

The transformer according to any one of items 1 to 10, further including a signal line electrically connected to the coil, wherein
- the core includes a first half and a second half on which the first half is placed, the first half includes a top surface and a side surface extending from the top surface, the second half includes a bottom surface and a side surface extending from the bottom surface, the side surfaces of the first and second halves constitute one surface of the core, the first half includes a cut in the side surface of the first half, the cut extending from an end adjacent to the second half to an end adjacent to the top surface, one of the plurality of radiator plates includes an outlet at a location corresponding to a location of the end of the cut that is adjacent to the top surface, and the signal line extends out of the transformer through the cut and the outlet.

Item 12

The transformer according to item 11, wherein the second half includes a cut in the side surface of the second half, the cut being continuous with the cut of the first half and extending to an end adjacent to the bottom surface.

Item 13

The transformer according to any one of items 1 to 12, wherein a thermally-conductive adhesive, grease, or sheet is located between the radiator plates and the core.

The transformer described above is applicable to a wide variety of electronic devices.

The foregoing description is given for illustrative purposes, and various modifications can be made without departing from the principles of the present invention.

What is claimed is:

1. A transformer comprising:

a coil;

a core enclosing the coil, the core including a first surface, a second surface adjoining the first surface, and a third surface opposite to the first surface and adjoining the second surface; and a plurality of radiator plates each of which covers a part of the core, wherein the first and third surfaces are covered by different radiator plates of the plurality of radiator plates, wherein the plurality of radiator plates include a first bent radiator plate covering the first and second surfaces and a second bent radiator plate covering the second and third surfaces, wherein the first and second bent radiator plates cover the second surface without overlapping each other, wherein in a front view of the second surface, a side of the first bent radiator plate that faces the second bent radiator plate and a side of the second bent radiator plate that faces the first bent radiator plate include inclined portions that are inclined with respect to a side of the second surface that is adjacent to the first surface, and wherein an inclined portion of the first bent radiator plate and an inclined portion of the second bent radiator plate, which faces to the inclined portion of the first bent radiator plate, extend in a same direction.

2. The transformer according to claim 1, wherein the first bent radiator plate covers the entire first surface, and the second bent radiator plate covers the entire third surface.

3. The transformer according to claim 1, wherein the core further includes a fourth surface opposite to the second surface and adjoining the third surface, and the second and fourth surfaces are covered by different radiator plates of the plurality of radiator plates.

4. The transformer according to claim 3, wherein the plurality of radiator plates include a first bent radiator plate covering the first and second surfaces, a second bent radiator plate covering the second and third surfaces, and a flat radiator plate covering the fourth surface.

5. The transformer according to claim 1, further comprising a signal line electrically connected to the coil, wherein the core includes a first half and a second half on which the first half is placed, the first half includes a top surface and a side surface extending from the top surface, the second half includes a bottom surface and a side surface extending from the bottom surface, the side surfaces of the first and second halves constitute one surface of the core, the first half includes a cut in the side surface of the first half, the cut extending from an end adjacent to the second half to an end adjacent to the top surface, one of the plurality of radiator plates includes an outlet at a location corresponding to a location of the end of the cut that is adjacent to the top surface, and the signal line extends out of the transformer through the cut and the outlet.

6. The transformer according to claim 5, wherein the second half includes a cut in the side surface of the second half, the cut being continuous with the cut of the first half and extending to an end adjacent to the bottom surface.

7. The transformer according to claim 1, wherein a thermally-conductive adhesive, grease, or sheet is located between the radiator plates and the core.

8. A transformer comprising:

a coil;

a core enclosing the coil, the core including a first surface, a second surface adjoining the first surface, and a third surface opposite to the first surface and adjoining the second surface; and a plurality of radiator plates each of which covers a part of the core, wherein the first and third surfaces are covered by different radiator plates of the plurality of radiator plates, and wherein the plurality of radiator plates include a first flat radiator plate covering the first surface, a second flat radiator plate covering the second surface, and a third flat radiator plate covering the third surface.

9. A transformer comprising:

a coil;

a core enclosing the coil, the core including a first surface, a second surface adjoining the first surface, and a third surface opposite to the first surface and adjoining the second surface; and a plurality of radiator plates each of which covers a part of the core, wherein the first and third surfaces are covered by different radiator plates of the plurality of radiator plates, wherein the core further includes a fourth surface opposite to the second surface and adjoining the third surface, wherein the second and fourth surfaces are covered by different radiator plates of the plurality of radiator plates, wherein the plurality of radiator plates include a first bent radiator plate covering the first and second surfaces, a second bent radiator plate covering the second and third surfaces, a third bent radiator plate covering the third and fourth surfaces, and a fourth bent radiator plate covering the fourth and first surfaces, and wherein the first, second, third, and fourth bent radiator plates do not overlap one another.

10. A transformer comprising:

a coil;

a core enclosing the coil, the core including a first surface, a second surface adjoining the first surface, and a third surface opposite to the first surface and adjoining the second surface; and a plurality of radiator plates each of which covers a part of the core, wherein the first and third surfaces are covered by different radiator plates of the plurality of radiator plates, wherein the core further includes a fourth surface opposite to the second surface and adjoining the third surface, wherein the second and fourth surfaces are covered by different radiator plates of the plurality of radiator plates, and wherein the plurality of radiator plates include a first bent radiator plate covering the first and second surfaces and a second bent radiator plate covering the third and fourth surfaces.

* * * * *